(12) United States Patent
Krueger et al.

(10) Patent No.: US 9,796,385 B2
(45) Date of Patent: Oct. 24, 2017

(54) ADAPTIVE CRUISE CONTROL SYSTEM AND METHOD INCORPORATING REGENERATIVE BRAKING AND START-STOP FUNCTIONS

(71) Applicant: GM Global Technology Operations LLC, Detroit, MI (US)

(72) Inventors: Eric E. Krueger, Chelsea, MI (US); Matthew J. Klemmer, South Lyon, MI (US); Kiana Bassey, Romulus, MI (US); Christopher E. Whitney, Commerce, MI (US); Patrick J. O'Leary, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 106 days.

(21) Appl. No.: 13/832,902

(22) Filed: Mar. 15, 2013

(65) Prior Publication Data

US 2014/0277989 A1    Sep. 18, 2014

(51) Int. Cl.
*B60W 10/192*    (2012.01)
*B60W 20/14*    (2016.01)
*B60W 30/16*    (2012.01)
*B60W 10/184*    (2012.01)
(Continued)

(52) U.S. Cl.
CPC ........ *B60W 30/162* (2013.01); *B60W 10/184* (2013.01); *B60W 10/196* (2013.01); *B60W 30/14* (2013.01); *B60W 2510/244* (2013.01); *B60W 2550/30* (2013.01); *B60W 2600/00* (2013.01); *B60W 2710/18* (2013.01); *B60W 2720/106* (2013.01); *Y10S 903/93* (2013.01); *Y10S 903/947* (2013.01)

(58) Field of Classification Search
None
See application file for complete search history.

(56) References Cited

U.S. PATENT DOCUMENTS 6,122,588 A * 9/2000 Shehan ................ B60K 31/047
                                                              180/167
2007/0272457 A1* 11/2007 Kodama .................. B60K 6/44
                                                              180/65.31

(Continued)

OTHER PUBLICATIONS

Anonymous, Mar. 10, 2013, Method for dtermining effective brake pedal position in hybrid vehicle, involves converting total braking torque to effective pedal position with mapping function when total braking torque applied to vehicle is determined, Reuters, RD587034.*

(Continued)

*Primary Examiner* — Rami Khatib
*Assistant Examiner* — Gerrad A Foster

(57) ABSTRACT

A system according to the principles of the present disclosure includes a cruise control module, an engine control module, and a brake control module. The cruise control module determines a cruise torque request based on at least one of a following distance of a vehicle and a rate at which the vehicle is approaching an object. The engine control module determines a negative torque capacity of a powertrain. The powertrain includes an engine and an electric motor. The brake control module applies a friction brake when the cruise torque request is less than the negative torque capacity of the powertrain.

27 Claims, 4 Drawing Sheets

(51) Int. Cl.
*B60W 10/196* (2012.01)
*B60W 30/14* (2006.01)

(56) References Cited

U.S. PATENT DOCUMENTS

2011/0246012 A1* 10/2011 McClain .................. B60L 7/18
    701/22
2011/0257854 A1* 10/2011 Whitney et al. ................ 701/54
2012/0055744 A1* 3/2012 Chen ....................... B60T 8/267
    188/106 P

OTHER PUBLICATIONS

Anonymous, Published digitally Feb. 15, 2013, Published in Mar. 2013 paper journal, Effective Brake Pedal Position for Hybrid Vehicles Using Chassis and Powertrain Torques, Reasearch Disclosure (www.researchdisclosure.com), Reuters, RD587034.*

* cited by examiner

US 9,796,385 B2

1

ADAPTIVE CRUISE CONTROL SYSTEM AND METHOD INCORPORATING REGENERATIVE BRAKING AND START-STOP FUNCTIONS

FIELD

The present disclosure relates to adaptive cruise control systems and methods incorporating regenerative braking and start-stop functions.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a cruise control module, an engine control module, and a brake control module. The cruise control module determines a cruise torque request based on at least one of a following distance of a vehicle and a rate at which the vehicle is approaching an object. The engine control module determines a negative torque capacity of a powertrain. The powertrain includes an engine and an electric motor. The brake control module applies a friction brake when the cruise torque request is less than the negative torque capacity of the powertrain.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

2

Figure 2:
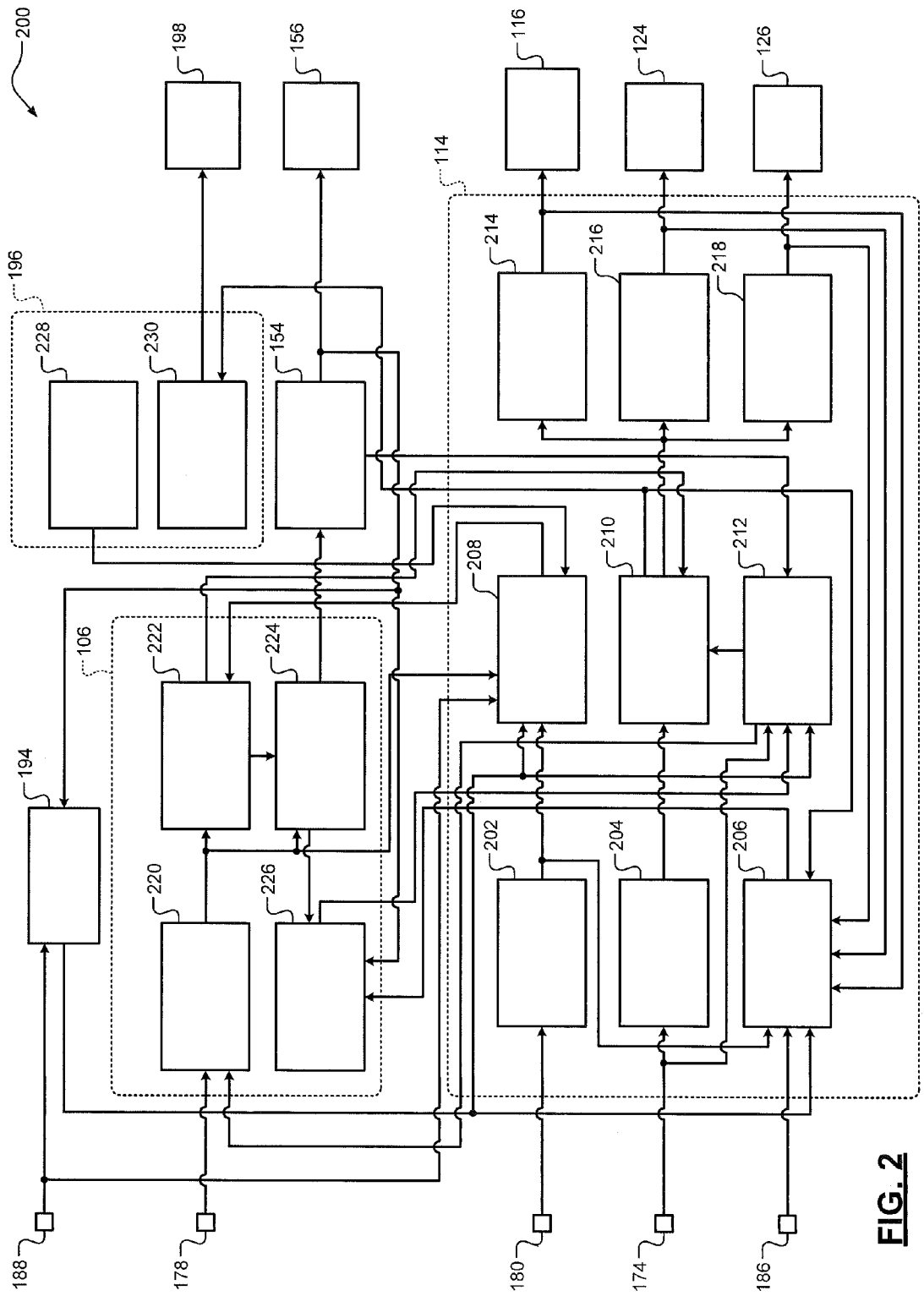
Figure 3:
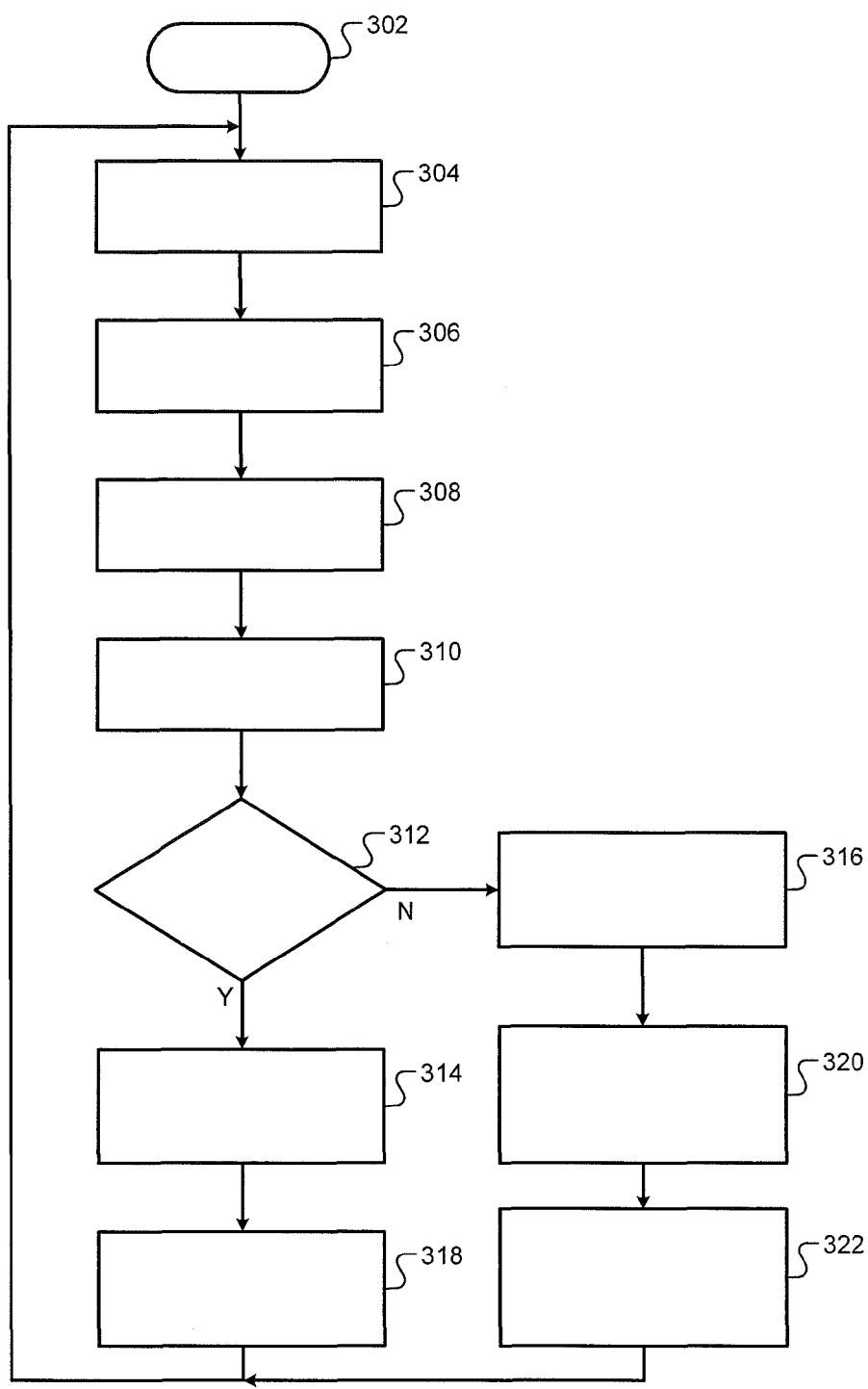
Figure 4:
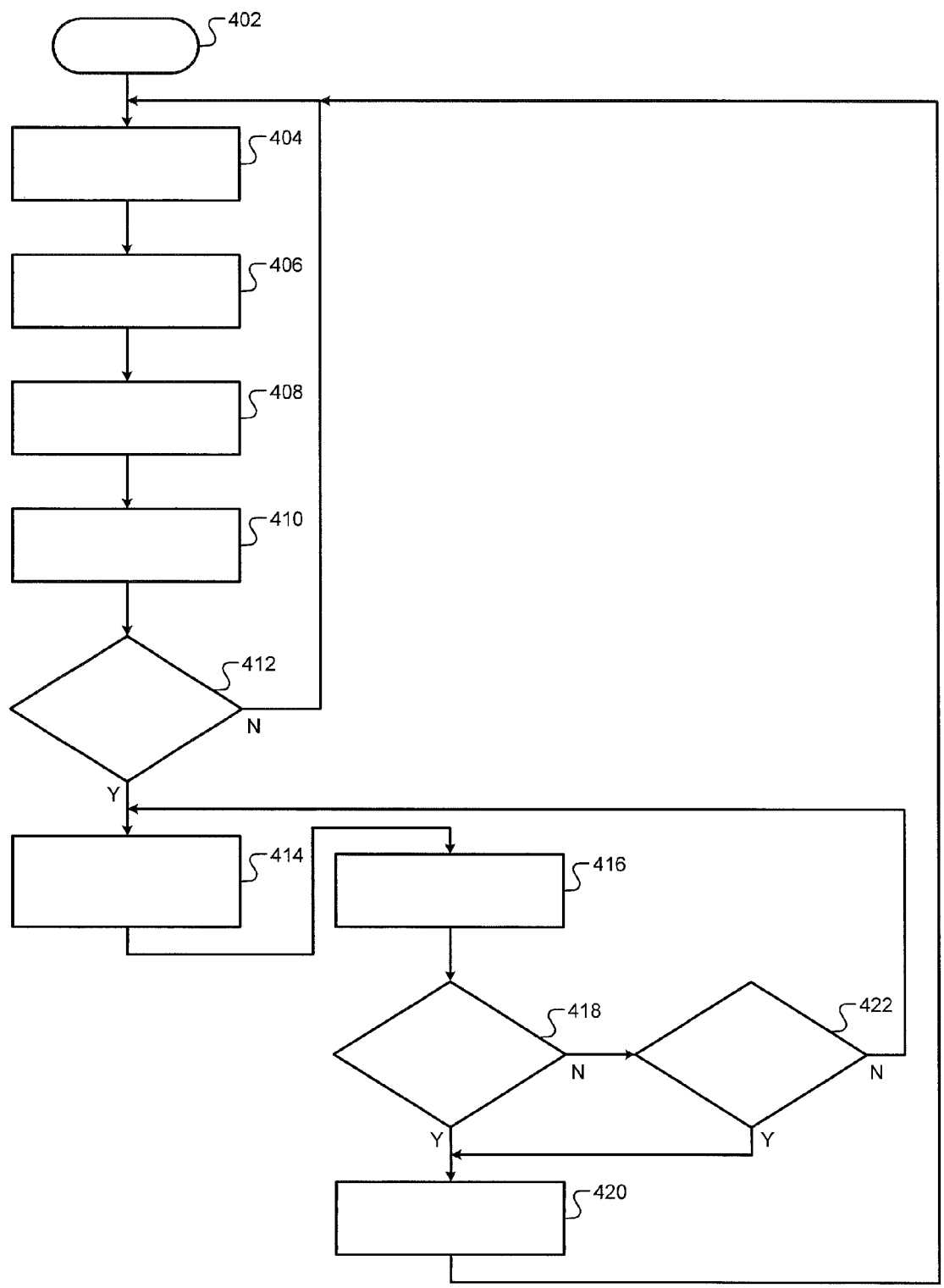

FIG. 2 is a functional block diagram of an example control system according to the principles of the present disclosure; and FIGS. 3 and 4 are flowcharts illustrating example control methods according to the principles of the present disclosure.

In the drawings, reference numbers may be reused to identify similar and/or identical elements.

DETAILED DESCRIPTION

An adaptive cruise control (ACC) system may decelerate a vehicle based on a following distance of a vehicle and a rate at which the vehicle is approaching an object. For example, the ACC system may decelerate the vehicle when the following distance is less than a predetermined distance and the ACC system may decelerate the vehicle at a rate that is based on the approach rate. The ACC system may decelerate the vehicle by applying a friction brake (e.g., a drum brake and/or a disc brake).

A hybrid powertrain control (HPC) system may decelerate a vehicle by controlling an electric motor to output a negative torque instead of or in addition to applying a friction brake. When the electric motor outputs a negative torque, the electric motor regenerates a battery that supplies power to the electric motor. In this regard, a negative motor torque may be referred to as a regenerative brake torque. Decelerating a vehicle by controlling an electric motor to output a negative torque instead of or in addition to applying a friction brake may improve fuel economy relative to only applying the friction brake.

A system and method according to the present disclosure determines a desired deceleration, determines a negative torque capacity of a hybrid powertrain, and applies a friction brake when the desired deceleration cannot be achieved using the hybrid powertrain alone. In other words, the system and method uses the negative torque capacity of the hybrid powertrain before applying the friction brake, which may improve fuel economy. The hybrid powertrain may include an engine and an electric motor.

A start-stop system may stop an engine when a driver depresses a brake pedal and may start an engine when the driver releases the brake pedal and/or when the driver depresses an accelerator pedal. Thus, the engine may be stopped and/or started based on a brake pedal position. When a vehicle is decelerated by an ACC system, the brake pedal position may not indicate whether the vehicle is stopping since the brake pedal may not be depressed while the ACC system decelerates the vehicle.

A system and method according to the present disclosure estimates a brake pedal position while an ACC system decelerates a vehicle. The estimated brake position may not correspond to an actual brake pedal position, but rather may be a virtual brake pedal position that corresponds to a deceleration rate and/or a negative torque. Estimating the brake pedal position enables automatic engine stops and starts while the ACC system decelerate the vehicle, which may improve fuel economy.

Figure 1:
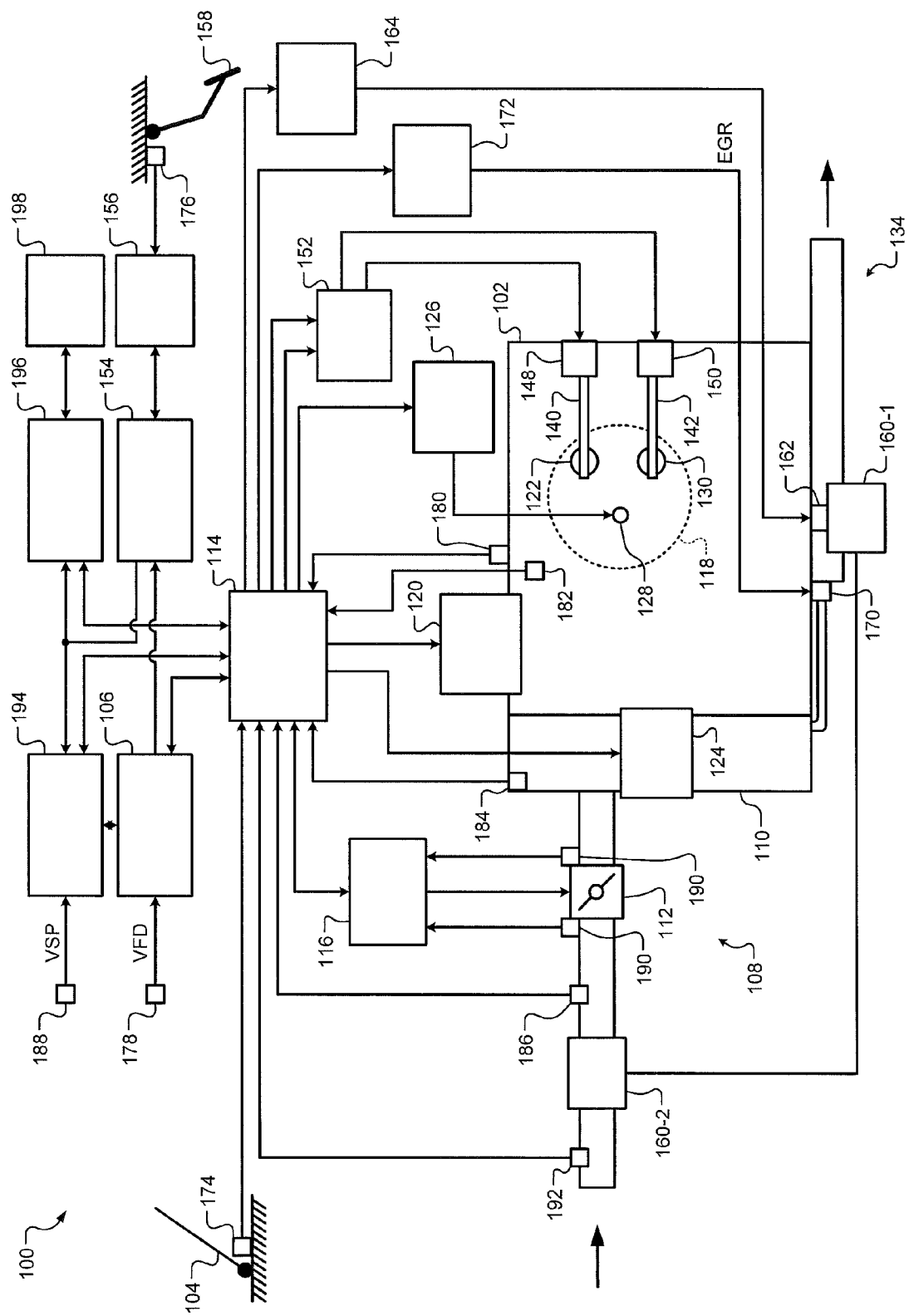
FIG. 1 is a functional block diagram of an example vehicle system according to the principles of the present disclosure.

Referring to FIG. 1, an example implementation of an engine system 100 includes an engine 102 that combusts an air/fuel mixture to produce drive torque for a vehicle. The drive torque produced by the engine 102 may be based on a position of an accelerator pedal 104. The drive torque produced by the engine 102 may also be based on an input from a cruise control module such as an adaptive cruise control (ACC) module 106. The ACC module 106 may vary vehicle speed to achieve a speed that is set by a driver while maintaining a predetermined following distance. The driver may adjust the set speed using a driver interface device (not shown) such as a lever, a button, and/or a touchscreen. In various implementations, the predetermined following distance may be selected from a plurality of predetermined following distances based on an input received from the driver.

Air is drawn into the engine 102 through an intake system 108. The intake system 108 includes an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 152 may control the intake cam phaser 148 and the exhaust cam phaser 150 based on signals from the ECM 114. When implemented, variable valve lift may also be controlled by the phaser actuator module 152.

As indicated above, the ACC module 106 may vary the vehicle speed to achieve a set speed while maintaining a predetermined following distance. The ACC module 106 may vary the vehicle speed by communicating with the ECM 114 to adjust the torque output of the engine. The ACC module 106 may also vary the vehicle speed by communicating with a brake control module (BCM) 154 to adjust the pressure within a brake system (not shown) of the vehicle. The BCM 154 controls a brake actuator module 156, which regulates the brake pressure to control the amount of friction within a friction brake (e.g., a drum brake and/or a disc brake). The BCM 154 may adjust the brake pressure based on input from the ACC module 106 and the ECM 114. The BCM 154 may also adjust the brake pressure based on the position of a brake pedal 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the accelerator pedal 104 using an accelerator pedal position (APP) sensor 174. The position of the brake pedal 158 may be measured using a brake pedal position (BPP) sensor 176. The following distance of the vehicle may be measured using a vehicle following distance (VFD) sensor 178, which may include a radar sensor and/or a laser sensor.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The speed of the vehicle may be measured using a vehicle speed (VSP) sensor 188 such as a wheel speed sensor or a transmission output shaft speed sensor. The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ACC module 106 and the ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by vehicle electrical systems and/or for storage in a battery. In various implementations, various functions of the ACC module 106, the ECM 114, the TCM 194, and the HCM 196 may be integrated into one or more modules.

Referring to FIG. 2, a control system 200 includes example implementations of the ACC module 106, the ECM 114, the TCM 194, and the HCM 196. The ECM 114 includes an engine speed module 202, a pedal torque module 204, an axle torque estimation module 206, a minimum axle torque module 208, a torque coordination module 210, and a start-stop module 212. The engine speed module 202 determines engine speed based on the crankshaft position from the CKP sensor 180. The engine speed module 202 may determine the engine speed based on an amount of crankshaft rotation between tooth detections and the corresponding period. The engine speed module 202 outputs the engine speed.

The pedal torque module 204 determines a pedal torque request based on the accelerator pedal position from the APP sensor 174. The pedal torque module 204 may store one or more mappings of accelerator pedal position to a desired torque, and may determine the pedal torque request based on a selected one of the mappings. The pedal torque module 204 outputs the pedal torque request.

The torque coordination module 210 coordinates the torque output of the engine 102 and the electric motor 198. The torque coordination module 210 may coordinate the torque output of the engine 102 and the electric motor 198 to satisfy the pedal torque request and/or an axle torque request generated by the ACC module 106. The discussion below concerns the way in which the torque coordination module 210 may coordinate the torque output of the engine 102 and the electric motor 198 to satisfy the pedal torque request. However, the torque coordination module 210 may coordinate the torque output of the engine 102 and the electric motor 198 to satisfy the axle torque request in a similar manner.

The torque coordination module 210 may satisfy the pedal torque request using only the electric motor 198 when the pedal torque request is within the torque capacity of the electric motor 198. The torque coordination module 210 may satisfy the pedal torque request using both the engine 102 and the electric motor 198 when the pedal torque request is outside of the torque capacity of the electric motor 198. The torque coordination module 210 may output an engine torque request and a motor torque request to adjust the torque output of the engine 102 and the electric motor 198, respectively. The motor torque request may be referred to as a regenerative brake torque request when the motor torque request is negative.

A throttle control module 214, a fuel control module 216, and a spark control module 218 may adjust the throttle area, the fuel injection amount, and the spark timing, respectively, to satisfy the engine torque request. The throttle control module 214 controls the throttle actuator module 116 to adjust the throttle area. The fuel control module 216 controls the fuel actuator module 124 to adjust the fuel injection amount. The spark control module 218 controls the spark actuator module 126 to adjust the spark timing.

The axle torque estimation module 206 estimates an actual axle torque. The actual axle torque is the amount of torque transferred to an axle (not shown) of the vehicle from the engine 102 and the electric motor 198. In various implementations, the axle torque estimation module 206 may estimate the amount of torque transferred from the engine 102 and the electric motor 198 to another location along a driveline (not shown) of the vehicle, such as at the crankshaft. In this regard, the actual axle torque may be referred to as an actual powertrain torque (e.g., an actual torque output of a powertrain that includes the engine 102 and the electric motor 198). The axle torque estimation module 206 may estimate the actual axle torque based on the torque output of the engine 102 and the electric motor 198, and a selected gear of the transmission.

The axle torque estimation module 206 may estimate the torque output of the engine 102 using a torque relationship such as $$T = f(APC, S, I, E, AF, OT, \#) \quad (1)$$

may be defined, where torque (T) is a function of air per cylinder (APC), spark timing (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

The axle torque estimation module 206 may determine the air per cylinder based on the mass flowrate from the MAF sensor 186, the engine speed, and/or the throttle area. The axle torque estimation module 206 may determine the air/fuel ratio based on the air per cylinder and the amount of fuel provided to each cylinder. The axle torque estimation module 206 may receive the throttle area, the fuel injection amount, and the spark timing from the throttle control module 214, the fuel control module 216, and the spark control module 218, respectively.

The axle torque estimation module 206 may estimate the torque output of the electric motor 198 based on the motor torque request. The axle torque estimation module 206 may receive the motor torque request from the torque coordination module 210. The axle torque estimation module 206 may determine an actual powertrain torque based on the sum of the estimated engine torque and the estimated motor torque. The axle torque estimation module 206 may determine the actual axle torque by multiplying the actual powertrain torque by a gear ratio corresponding to the selected gear. The axle torque estimation module 206 may receive the selected gear and/or the corresponding gear ratio from the TCM 194. The axle torque estimation module 206 outputs the actual axle torque.

The minimum axle torque module 208 determines a minimum axle torque. The minimum axle torque may be a maximum value of a desired minimum axle torque and a minimum axle torque capacity. The desired minimum axle torque is the desired amount of axle torque when the driver removes their foot from the accelerator pedal, such as when the vehicle is idling or coasting down from a higher speed. The minimum axle torque module 208 may determine the desired minimum axle torque based on vehicle speed. For example, the minimum axle torque module 208 may adjust the desired minimum axle torque to linearly decrease the vehicle speed during vehicle coastdown until a desired speed is reached.

When the ACC module 106 is active (e.g., controlling the vehicle speed), the desired minimum axle torque may be decreased to a value that is less than a lower limit of the minimum axle torque capacity. Thus, the minimum axle torque may always be equal to the minimum torque capacity when the ACC module 106 is active. The minimum axle torque module 208 may determine whether the ACC module 106 is active based on an input from the ACC module 106 such as a cruise torque request.

The minimum axle torque capacity is the minimum amount of torque that the engine 102 and the electric motor 198 are capable of transferring to the axle. In various implementations, the minimum axle torque module 208 may determine the minimum amount of torque that the engine 102 and the electric motor 198 are capable of transferring to another location along the driveline, such as at the crankshaft. In this regard, the minimum axle torque capacity may be referred to as a minimum powertrain torque capacity, a lower limit of a powertrain torque capacity, or a negative torque capacity of the powertrain. In addition, the minimum axle torque module 208 may be referred to as a minimum powertrain torque module. The minimum axle torque module 208 may determine the minimum axle torque capacity based on the minimum torque capacities of the engine 102 and the electric motor 198, the engine speed, the vehicle speed, and/or the selected gear of the transmission.

The minimum torque capacity of the electric motor 198 may be a negative value. The minimum axle torque module 208 may receive the minimum torque capacity of the electric motor 198 from the HCM 196. The minimum torque capacity of the engine 102 may be the torque output of the engine 102 when the driver's foot is removed from the accelerator pedal 104. The minimum axle torque module 208 may determine the minimum torque capacity of the engine 102 based on a minimum amount of airflow, a minimum amount of fuel flow, and/or a maximum amount of spark retard that avoids stalling the engine 102 and/or provides a minimum level of engine idle quality.

The minimum axle torque module 208 may determine a minimum powertrain torque based on the sum of the minimum torque capacity of the engine 102 and the minimum torque capacity of the electric motor 198. The minimum axle torque module 208 may determine the minimum axle torque capacity by multiplying the minimum powertrain torque by the gear ratio corresponding to the selected gear. The minimum axle torque module 208 may receive the selected gear and/or the corresponding gear ratio from the TCM 194. The minimum axle torque module 208 outputs the minimum axle torque.

The start-stop module 212 automatically stops and restarts the engine 102 when the engine 102 is idling. The start-stop module 212 may automatically stop the engine 102 when the vehicle speed is less than or equal to a predetermined speed (e.g., zero) and the driver depresses the brake pedal 158. The start-stop module 212 may automatically restart the engine 102 when the driver releases the brake pedal 158, when the driver depresses the accelerator pedal 104, and/or when the driver depresses a resume switch (not shown).

The start-stop module 212 may receive the vehicle speed from the TCM 194. The start-stop module 212 may determine when the driver depresses or releases the brake pedal 158 based on an input received from the BCM 154. The start-stop module 212 may determine when the driver depresses or releases the accelerator pedal 104 based on the accelerator pedal position from the APP sensor 174.

The start-stop module 212 may automatically stop and restart the engine 102 by sending a signal to the torque coordination module 210. The torque coordination module 210 may adjust the engine torque request to a first value (e.g., zero) to automatically stop the engine 102. The torque coordination module 210 may adjust the engine torque request to a second value (e.g., a non-zero value) to automatically restart the engine 102. The fuel control module 216 and/or the spark control module 218 may stop the engine 102 when the engine torque request is equal to the first value and may start the engine 102 when the engine torque request is equal to the second value.

The fuel control module 216 may stop or start the engine 102 by instructing the fuel actuator module 124 to stop or start providing fuel to the cylinder 118. The spark control module 218 may stop or start the engine 102 by instructing the spark actuator module 126 to stop or start generating spark. In various implementations, the start-stop module 212 may automatically stop and restart the engine 102 by sending signals directly to the fuel control module 216 and/or the spark control module 218.

The ACC module 106 includes a cruise torque module 220, an axle torque request module 222, a brake torque module 224, and a pedal position module 226. The cruise torque module 220 determines the cruise torque request based on the set speed, the vehicle speed, the measured following distance, the rate at which the vehicle is approaching an object, and/or the grade of the road on which the vehicle is travelling. The cruise torque module 220 may determine a desired acceleration when the vehicle speed is less than the set speed and the measured following distance is greater than the predetermined following distance. The cruise torque module 220 may determine the desired acceleration based on the difference between the set speed and the vehicle speed. Additionally, the cruise torque module 220 may adjust the cruise torque request to a positive value in order to adjust the actual acceleration to the desired acceleration.

The cruise torque module 220 may determine a desired deceleration when the vehicle speed is greater than the set speed and/or when the measured following distance is less than the predetermined following distance. In this regard, the cruise torque module 220 may be referred to as a desired deceleration module. The cruise torque module 220 may determine the desired deceleration based on the difference between the set speed and the vehicle speed, the difference between the measured following distance and the predetermined following distance, and/or the approach rate. Additionally, the cruise torque module 220 may adjust the cruise torque request to a negative value in order to adjust the actual deceleration to the desired deceleration. The cruise torque module 220 may determine the actual acceleration and the actual deceleration based on the vehicle speed. The cruise torque module 220 outputs the cruise torque request, the desired acceleration, and/or the desired deceleration.

When the engine 102 is stopped, the cruise torque module 220 may not adjust the cruise torque request to a positive value until the driver depresses the accelerator pedal 104 and/or the driver depresses the resume switch. The cruise torque module 220 may determine whether the driver depresses the accelerator pedal 104 and/or the driver depresses the resume switch based on a signal received from the start-stop module 212.

The axle torque request module 222 determines an axle torque request. The axle torque request is a desired amount of torque transfer to the axle from the engine 102 and the electric motor 198. The axle torque request module 222 may determine the axle torque request based on the cruise torque request and the minimum axle torque. The axle torque request module 222 may set the axle torque request equal to the cruise torque request when the absolute value of the cruise torque request is less than or equal to the absolute value of the minimum axle torque. The axle torque request module 222 may set the axle torque request equal to the minimum axle torque when the absolute value of the cruise torque request is greater than the absolute value of the minimum axle torque. The axle torque request module 222 outputs the axle torque request.

In various implementations, the axle torque request module 222 may determine the desired amount of torque transfer from the engine 102 and the electric motor 198 to another location along a driveline of the vehicle, such as to the crankshaft. In this regard, the axle torque request module 222 may be referred to as a powertrain torque request module, and the axle torque request may be referred to as a powertrain torque request.

The brake torque module 224 determines a friction brake torque request. The friction brake torque request is a desired amount of torque due to friction within the friction brake. The brake torque module 224 may determine the friction brake torque request based on the difference between the cruise torque request and the axle torque request. Thus, the friction brake torque request may be zero when the axle torque request is equal to the cruise torque request. The brake torque module 224 outputs the friction brake torque request. In various implementations, the brake torque module 224 may be omitted, and the cruise torque module 220 may provide the desired deceleration directly to the BCM 154.

The pedal position module 226 estimates the brake pedal position. The start-stop module 212 may use the estimated brake pedal position instead of the measured brake pedal position when the brake pressure is controlled based on an input from the ACC module 106 rather than the brake pedal position. The pedal position module 226 may estimate the brake pedal position based on a predetermined relationship between the brake pedal position and the sum of the estimated axle torque and an estimated friction brake torque. The predetermined relationship may be embodied in a lookup table.

The pedal position module 226 may estimate the friction brake torque based on the friction brake torque request. The pedal position module 226 may receive the friction brake torque request from the brake torque module 224 and/or the estimated friction brake torque from the BCM 154. The pedal position module 226 outputs the estimated brake pedal position. In various implementations, the pedal position module 226 may be included in the ACC module 106, the ECM 114, and/or the HCM 196.

The HCM 196 includes a motor torque capacity module 228 and a motor control module 230. The motor torque capacity module 228 determines the torque capacity of the electric motor 198, including the minimum torque capacity of the electric motor 198. The motor torque capacity module 228 may determine the motor torque capacity based on the capability of the electric motor 198 to generate power; the capability of the battery to receive power, and/or the vehicle speed. The motor torque capacity module 228 may determine the capability of the battery to receive power based on the state-of-charge of the battery and the power intake capacity of the battery. The motor torque capacity module 228 outputs the motor torque capacity.

The motor control module 230 adjusts the torque output of the electric motor 198 to satisfy the motor torque request. The motor control module 230 may adjust the torque output of the electric motor 198 by adjusting the amount of power supplied to the electric motor 198. The motor control module 230 may output a signal indicating the amount of power to be supplied to the electric motor 198, and a power supply may adjust the amount of power supplied to the electric motor 198 in response to the signal.

The BCM 154 controls the brake pressure to adjust the amount of friction within the friction brake. The BCM 154 may control the brake pressure based on the friction brake torque request from the brake torque module 224. The BCM 154 may determine a desired brake pressure based on a predetermined relationship between brake torque and brake pressure. The predetermined relationship may be embodied in a lookup table.

In various implementations, the BCM 154 may determine the friction brake torque request and/or the brake pressure based on the deceleration request. The BCM 154 may determine an actual deceleration of the vehicle based on the vehicle speed. The BCM 154 may adjust the friction brake torque request and/or the brake pressure to adjust the actual deceleration to the deceleration request. Since the torque output of the electric motor 198 affects the actual deceleration, the BCM 154 may account for the torque output of the electric motor 198 when adjusting the friction brake torque request and/or the brake pressure. If the BCM 154 adjusts the brake pressure based on the deceleration request, the BCM 154 may estimate the friction brake torque based on the predetermined relationship between brake torque and brake pressure The BCM 154 outputs the desired brake pressure and may output the friction brake torque.

The TCM 194 shift gears in the transmission based on the friction brake torque. The TCM 194 may downshift the transmission if the friction brake torque is greater than a predetermined torque for a period that is greater than a predetermined period. The friction brake torque may be greater than the predetermined torque when the vehicle is travelling down a moderate grade. The TCM 194 may estimate the friction brake torque based on the friction brake torque request received from the brake torque module 224 and/or the TCM 194 may receive the estimated friction brake torque from the BCM 154.

Referring to FIG. 3, an example method for coordinating cruise control and regenerative braking functions begins at 302. The method may apply to a powertrain that includes an engine and an electric motor powered by a battery. At 304, the method determines a minimum toque capacity of the electric motor. The method may determine the minimum motor torque capacity based on the capability of the electric motor to generate power, the capability of the battery to receive power, and/or a vehicle speed. The method may determine the capability of the battery to receive power based on the state-of-charge of the battery and the power intake capacity of the battery.

At 306, the method determines a minimum axle torque. The minimum axle torque may be the minimum amount of torque that the engine and the electric motor are capable of transferring to an axle of a vehicle. In various implementations, the method may determine the minimum amount of torque that the engine and the electric motor are capable of transferring to another location along the driveline, such as at a crankshaft. The method may determine the minimum axle torque based on the minimum torque capacities of the engine and the electric motor, an engine speed, the vehicle speed, and/or a selected gear of a transmission.

The minimum torque capacity of the engine may be the torque output of the engine when a driver's foot is removed from an accelerator pedal of the vehicle. The method may determine the minimum torque capacity of the engine based on a minimum amount of airflow, a minimum amount of fuel flow, and/or a maximum amount of spark retard that avoid stalling the engine and/or provides a minimum level of engine idle quality. The method may determine a minimum powertrain torque based on the sum of the minimum torque capacity of the engine and the minimum torque capacity of the electric motor. The method may determine the minimum axle torque by multiplying the minimum powertrain torque by the gear ratio corresponding to the selected gear.

At 308, the method determines a desired deceleration. The method may determine the desired deceleration based on the set speed, the vehicle speed, the measured following distance, the rate at which the vehicle is approaching an object, and/or the grade of the road on which the vehicle is travelling. In one example, the method determines the desired deceleration based on a difference between the set speed and the vehicle speed. In another example, the method determines the desired deceleration based on a difference between a predetermined following distance and an actual following distance. In another example, the method determines the desired deceleration based on the approach rate.

At 310, the method determines a cruise torque request. The method may adjust the cruise torque request to decrease the difference between the desired deceleration and an actual deceleration. The method may determine the actual deceleration based on the vehicle speed. The method may measure the vehicle speed using, for example, a wheel speed sensor or a transmission output shaft speed sensor.

At 312, the method determines whether the absolute value of the minimum axle torque is greater than or equal to the absolute value of the cruise torque request. If the absolute value of the maximum axle torque is greater than or equal to the absolute value of the cruise torque request, the method continues at 314. Otherwise, the method continues at 316.

At 314, the method sets an axle torque request equal to the cruise torque request. The axle torque request is a desired amount of torque transfer to the axle from the engine and the electric motor. In various implementations, the method may determine the desired amount of torque transfer from the engine and the electric motor to another location along a driveline of the vehicle, such as to the crankshaft.

The method may satisfy the axle torque request using only the electric motor when the axle torque request is within the torque capacity of the electric motor. The method may satisfy the axle torque request using both the engine and the electric motor when the axle torque request is outside of the torque capacity of the electric motor. The method may generate an engine torque request and a motor torque request to adjust the torque output of the engine and the electric motor, respectively.

At 318, the method sets a friction brake torque request to zero. The friction brake torque request is a desired amount of brake torque due to friction within a friction brake (e.g., a drum brake and/or a disc brake) of a brake system. The method may adjust the pressure within the brake system based on the friction brake torque request. Thus, the method may adjust the brake pressure to zero when the friction brake torque request is equal to zero.

At 316, the method sets the axle torque request equal to the minimum axle torque. At 320, the method determines a difference between the cruise torque request and the minimum axle torque. At 322, the method sets the friction brake torque request equal to the difference between the cruise torque request and the minimum axle torque.

In various implementations, the method may adjust the brake pressure based on the desired deceleration instead of adjusting the brake pressure based on the friction brake torque request. In these implementations, the friction brake may not be applied when the powertrain is capable of decelerating the vehicle at the desired deceleration without the assistance of the friction brake. The powertrain may be capable of decelerating the vehicle at the desired deceleration without the assistance of the friction brake when the absolute value of the minimum axle torque is greater than or equal to the absolute value of the cruise torque request.

Referring to FIG. 4, an example method for coordinating cruise control and start-stop functions begins at 402. The method applies to a hybrid powertrain that includes an engine and an electric motor powered by a battery. One or more (e.g., all) of the steps illustrated in FIG. 4 may be incorporated in the method of FIG. 3. Similarly, one or more (e.g., all) of the steps illustrated in FIG. 4 may be incorporated in the method of FIG. 3.

At 404, the method estimates a friction brake torque. The friction brake torque is a brake torque at an axle, or at another location along a driveline, due to friction within a friction brake (e.g., a drum brake and/or a disc brake) of a brake system. The method may estimate the friction brake torque based on the brake pressure and a predetermined relationship between brake pressure and brake torque. The predetermined relationship may be embodied in a lookup table.

At 406, the method estimates an actual axle torque. The actual axle torque is the amount of torque transferred to the axle from the engine and the electric motor. In various implementations, the method may estimate the amount of torque transferred from the engine and the electric motor to another location along the driveline such as at the crankshaft. The method may estimate the axle torque output based on the torque output of the engine, the torque output of the electric motor, and a selected gear of the transmission.

The method may estimate the torque output of the engine using a torque relationship such as $$T = f(APC, S, I, E, AF, OT, \#) \quad (1)$$

may be defined, where torque (T) is a function of air per cylinder (APC), spark timing (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. The method may determine the air per cylinder based on a mass flowrate of intake air, engine speed, and/or a throttle area. The method may determine the air/fuel ratio based on the air per cylinder and the amount of fuel provided to each cylinder of the engine.

The method may estimate the torque output of the electric motor based on the motor torque request. The method may determine an actual powertrain torque based on the sum of the estimated engine torque and the estimated motor torque. The method may determine the actual axle torque by multiplying the actual powertrain torque by a gear ratio corresponding to the selected gear.

At 408, the method estimates a brake pedal position. The method may determine a total brake torque based on a sum of the friction brake torque and the actual axle torque. The method may then estimate the brake pedal position based on the total brake torque and a predetermined relationship between brake torque and brake pedal position. Additionally or alternatively, the method may estimate the brake pedal position based on the brake pressure and a predetermined relationship between brake pressure and brake pedal position.

At 410, the method determines a percentage of brake pedal depression based on the brake pedal position. At 412, the method determines whether the brake pedal depression percentage is greater than a first percentage. If the brake pedal depression percentage is greater than the first percentage, the method continues at 414. Otherwise, the method continues at 404.

At 414, the method does not adjust the cruise torque request to a positive value. The method may also stop the engine when the brake pedal depression percentage is greater than the first percentage. At 416, the method determines a percentage of accelerator pedal depression based on an accelerator pedal position. The method may measure the accelerator pedal position.

At 418, the method determines whether the accelerator pedal depression percentage is greater than a second percentage. If the accelerator pedal depression percentage is greater than the second percentage, the method continues at 420. Otherwise, the method continues at 422.

At 420, the method adjusts the cruise torque request to a positive value if acceleration is desired. At 422, the method determines whether the brake pedal depression percentage is less than a third percentage. If the brake pedal percentage is less than the third percentage, the method continues at 420. Otherwise, the method continues at 414. The first percentage, the second percentage, and/or the third percentage may be predetermined, and the third percentage may be less than the first percentage. The method may also determine whether a resume button is depressed after the engine is stopped, continue to 420 if the resume button is depressed, and continue to 414 if the resume button is not depressed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

What is claimed is:

1. A system comprising:
a cruise control module that determines a cruise torque request based on at least one of a following distance of a vehicle to an object and a rate at which the vehicle is approaching the object;
an engine control module that determines a negative torque capacity of a powertrain in the vehicle, wherein the powertrain includes an engine and an electric motor;
a brake control module that:
   applies a friction brake in the vehicle based on a determination that the cruise torque request is less than the negative torque capacity of the powertrain; and
   refrains from applying the friction brake based on a determination that the cruise torque request is negative and greater than or equal to the negative torque capacity of the powertrain; and
a pedal position module that estimates a brake pedal position, wherein the engine control module:
   receives a measured brake pedal position from a brake pedal position sensor;
   determines a percentage of brake pedal depression based on at least one of the estimated brake pedal position and the measured brake pedal position;
   stops the engine based on the measured brake pedal position when the friction brake is controlled based on the measured brake pedal position and the brake pedal depression percentage is greater than a first percentage; and
   stops the engine based on the estimated brake pedal position when the friction brake is controlled based on the cruise torque request and the brake pedal depression percentage is greater than the first percentage.

2. The system of claim 1 wherein the cruise control module includes a desired deceleration module that determines a desired deceleration based on the at least one of the following distance and the approach rate.

3. The system of claim 2 wherein the brake control module controls a pressure of fluid supplied to the friction brake based on the desired deceleration.

4. The system of claim 1 wherein the cruise control module includes a powertrain torque request module that determines a powertrain torque request based on the cruise torque request and the negative torque capacity of the powertrain.

5. The system of claim 4 wherein the powertrain torque request module adjusts the powertrain torque request to the cruise torque request when the cruise torque request is greater than the negative torque capacity of the powertrain.

6. The system of claim 4 wherein the powertrain torque request module adjusts the powertrain torque request to the negative torque capacity of the powertrain when the cruise torque request is less than the negative torque capacity of the powertrain.

7. The system of claim 1 further comprising a motor torque capacity module that determines a negative torque capacity of the electric motor based on at least one of a power generation capacity of the electric motor, a power receiving capacity of a battery that supplies power to the electric motor, and a state-of-charge of the battery.

8. The system of claim 1 wherein the pedal position module estimates the brake pedal position based on a negative axle torque provided by the powertrain and a friction brake torque.

9. The system of claim 8 further comprising an axle torque estimation module that estimates the negative axle torque based on at least one of a motor torque request, a vehicle speed, and an amount of fuel provided to each cylinder of the engine.

10. The system of claim 1 wherein the brake control module controls the electric motor to apply a regenerative brake torque and refrains from applying the friction brake when the cruise torque request is negative and greater than or equal to the negative torque capacity of the powertrain.

11. The system of claim 1 wherein the pedal position module estimates the brake pedal position based on a brake pressure.

12. The system of claim 1 wherein the engine control module:
determines the brake pedal depression percentage based on the measured brake pedal position when the friction brake is controlled based on the measured brake pedal position; and
determines the brake pedal depression percentage based on the estimated brake pedal position when the friction brake is controlled based on the measured brake pedal position.

13. A method comprising:
determining a cruise torque request based on at least one of a following distance of a vehicle to an object and a rate at which the vehicle is approaching the object;
determining a negative torque capacity of a powertrain in the vehicle, wherein the powertrain includes an engine and an electric motor;
applying a friction brake in the vehicle based on a determination that the cruise torque request is less than the negative torque capacity of the powertrain;
refraining from applying the friction brake when based on a determination that the cruise torque request is negative and greater than or equal to the negative torque capacity of the powertrain;
estimating a brake pedal position;
receiving a measured brake pedal position from a brake pedal position sensor;
determining a percentage of brake pedal depression based on at least one of the estimated brake pedal position and the measured brake pedal position;
stopping the engine based on the measured brake pedal position when the friction brake is controlled based on the measured brake pedal position and the brake pedal depression percentage is greater than a first percentage; and
stopping the engine based on the estimated brake pedal position when the friction brake is controlled based on the cruise torque request and the brake pedal depression percentage is greater than the first percentage.

14. The method of claim 13 further comprising determining a desired deceleration based on the at least one of the following distance and the approach rate.

15. The method of claim 14 further comprising controlling a pressure of fluid supplied to the friction brake based on the desired deceleration.

16. The method of claim 13 further comprising determining a powertrain torque request based on the cruise torque request and the negative torque capacity of the powertrain.

17. The method of claim 16 further comprising adjusting the powertrain torque request to the cruise torque request when the cruise torque request is greater than the negative torque capacity of the powertrain.

18. The method of claim 16 further comprising adjusting the powertrain torque request to the negative torque capacity of the powertrain when the cruise torque request is less than the negative torque capacity of the powertrain.

19. The method of claim 13 further comprising determining a negative torque capacity of the electric motor based on at least one of a power generation capacity of the electric motor, a power receiving capacity of a battery that supplies power to the electric motor, and a state-of-charge of the battery.

20. The method of claim 13 further comprising estimating the brake pedal position based on a negative axle torque provided by the powertrain and a friction brake torque.

21. The method of claim 20 further comprising estimating the negative axle torque based on at least one of a motor torque request, a vehicle speed, and an amount of fuel provided to each cylinder of the engine.

22. The method of claim 13 further comprising controlling the electric motor to apply a regenerative brake torque and refraining from applying the friction brake when the cruise torque request is negative and greater than or equal to the negative torque capacity of the powertrain.

23. The method of claim 13 further comprising estimating the brake pedal position based on a brake pressure.

24. The method of claim 13 further comprising:
determining the brake pedal depression percentage based on the measured brake pedal position when the friction brake is controlled based on the measured brake pedal position; and
determining the brake pedal depression percentage based on the estimated brake pedal position when the friction brake is controlled based on the measured brake pedal position.

25. A method comprising:
determining a cruise torque request based on at least one of a following distance of a vehicle to an object and a rate at which the vehicle is approaching the object;
controlling a powertrain to provide a negative axle torque based on the cruise torque request, wherein the powertrain includes an engine and an electric motor;
controlling a friction brake to provide a friction brake torque based on the cruise torque request; and
determining a percentage of brake pedal depression based on at least one of the at least one of the negative axle torque and the friction brake torque; and
stopping the engine based on at least one of the negative axle torque and the friction brake torque when the friction brake is controlled based on the cruise torque request and the brake pedal depression percentage is greater than a first percentage.

26. The method of claim 25 further comprising stopping the engine based on the negative axle torque and the friction brake torque when the friction brake is controlled based on the cruise torque request and the brake pedal depression percentage is greater than the first percentage.

27. The method of claim 25 further comprising:
estimating a brake pedal position based on the at least one of the negative axle torque and the friction brake torque;
receiving a measured brake pedal position from a brake pedal position sensor;
determining the brake pedal depression percentage based on at least one of the estimated brake pedal position and the measured brake pedal position;
stopping the engine based on the measured brake pedal position when the friction brake is controlled based on the measured brake pedal position and the brake pedal depression percentage is greater than the first percentage; and
stopping the engine based on the estimated brake pedal position and independent of the measured brake pedal position when the friction brake is controlled based on the cruise torque request and the brake pedal depression percentage is greater than the first percentage.

* * * * *